United States Patent
Wolpe

(10) Patent No.: US 7,350,145 B2
(45) Date of Patent: Mar. 25, 2008

(54) METHODS AND SYSTEMS FOR PROVIDING TECHNOLOGY-ASSISTED CONTENT DEVELOPMENT

(75) Inventor: David Wolpe, Dublin, NH (US)

(73) Assignee: Multiworks, Inc., Dublin, NH (US)

( * ) Notice: Subject to any disclaimer, the term of this patent is extended or adjusted under 35 U.S.C. 154(b) by 582 days.

(21) Appl. No.: 10/134,786

(22) Filed: Apr. 30, 2002

(65) Prior Publication Data
US 2002/0174144 A1 Nov. 21, 2002

Related U.S. Application Data

(60) Provisional application No. 60/286,991, filed on Apr. 30, 2001.

(51) Int. Cl.
  G06F 15/00 (2006.01)
  G06F 17/00 (2006.01)
(52) U.S. Cl. ............ 715/540; 715/532; 704/257
(58) Field of Classification Search .......... 707/533, 707/100, 534; 715/532; 175/540; 704/257
See application file for complete search history.

(56) References Cited

U.S. PATENT DOCUMENTS

| | | | |
|---|---|---|---|
| 4,586,035 A | 4/1986 | Baker et al. ............ 340/712 |
| 5,267,155 A | 11/1993 | Buchanan et al. ..... 364/419.14 |
| 5,611,694 A | 3/1997 | Bromley .................... 434/311 |
| 5,761,689 A * | 6/1998 | Rayson et al. ............ 715/533 |
| 5,802,534 A | 9/1998 | Hatayama et al. ........ 707/530 |
| 5,805,911 A * | 9/1998 | Miller ...................... 715/534 |
| 5,873,660 A | 2/1999 | Walsh et al. .............. 400/63 |
| 6,011,555 A | 1/2000 | Eckhoff et al. ........... 345/353 |
| 6,131,102 A * | 10/2000 | Potter ....................... 715/533 |
| 6,182,095 B1 | 1/2001 | Leymaster et al. ....... 707/515 |
| 6,377,965 B1 * | 4/2002 | Hachamovitch et al. .. 715/534 |
| 6,470,345 B1 * | 10/2002 | Doutre et al. ............ 707/100 |
| 6,813,603 B1 * | 11/2004 | Groner et al. ............ 704/235 |
| 6,829,607 B1 * | 12/2004 | Tafoya et al. ............. 707/6 |
| 6,976,214 B1 * | 12/2005 | Bates et al. .............. 715/532 |

OTHER PUBLICATIONS

Microsoft Word 2000, copyright 1999 (see screenshots).*
Karen KuKich, Technique for automatically correcting words in text, Dec. 1992, vol. 24, Issue 4, ACM Press, pp. 377-439.*

(Continued)

Primary Examiner—William Bashore
Assistant Examiner—James Debrow
(74) Attorney, Agent, or Firm—Finnegan Henderson Farabow Garrett & Dunner LLP

(57) ABSTRACT

A computerized system and method for personalizing a document. In one embodiment, a user at a computer retrieves a first message comprising at least one change point from memory. A change point is a word or phrase which may be substituted for other words/phrases by a user to slightly alter a message or enhance its meaning. Once the message is retrieved, the user substitutes an alternate phrase for the change point to personalize the message. The present invention also includes a method for populating a database with personalized words and phrases. In operation, the system monitors a user's deletion and subsequent addition of text into a document. The system compares the deleted text with a change point stored in a database, and then associates the added text (if any) with a change point in the database if there is a change point entry in the database corresponding to the deleted text.

23 Claims, 9 Drawing Sheets

OTHER PUBLICATIONS

Lonnie E. Moseley and David M. Boodey, Microsoft Office 97, second edition, published Jan. 1997, pp. 159, 317-319.*

Tsunoda et al, Character recognition by Associative Completion on Words;, Neural Networks, 1993, pp. 1135-1138.*

Nagao et al.,"Automatic Text Summarization Based on the Global Document Annotation", Association for Computational Linguistic, 1998, pp. 917-921.*

Web Page: www.politicaloutreach.com/outreach/soeearthday/index.asp (Jun. 11, 2002).

Web Page: technology.workplace.aol.monster.com/games/iquit/index.asp (Jun. 11, 2002).

PCT International Search Report issued in related International Application No. PCT/US02/13431, mailed Jul. 11, 2002.

PCT Written Opinion issued in related International Application No. PCT/US02/13431, mailed Feb. 25, 2003.

PCT Notification of Transmittal of International Preliminary Examination Report issued in related International Application No. PCT/US02/13431, mailed Nov. 10, 2003.

* cited by examiner

THIS MAN CALLED ME UP THIS MORNING.

THIS INCREDIBLY RUDE, PRYING, TELEMARKETING HIRED GUN CALLED ME UP THIS MORNING.

METHODS AND SYSTEMS FOR PROVIDING TECHNOLOGY-ASSISTED CONTENT DEVELOPMENT

RELATED APPLICATIONS

This application claims priority from the following U.S. Provisional Application, the disclosure of which is incorporated by reference in its entirety for all purposes: U.S. Provisional Application Ser. No. 60/286,991 to David Wolpe, entitled, "Technology-Assisted Content Development," filed Apr. 30, 2001.

DESCRIPTION

1. Technical Field

This invention relates to methods and apparatus for organizing and displaying information, and more particularly, to computer-based methods and apparatus for associative organization, processing and display of interrelated pieces of information.

2. Background

The general-purpose digital computer is one of the most powerful and remarkable information processing tools ever invented. Indeed, the advent of the digital computer, and the proliferation of a global digital information network known as the Internet, has thrust the world headlong into what is now recognized by many analysts as an "information era" and an "information economy," in which the ability to access and process information in an effective manner is one of the most important forms of economic power.

The potential impact of the digital computer and the Internet on information distribution and processing is undeniably revolutionary. Yet, conventional software environments are generally organized around metaphors and principles from earlier eras. Text-based operating systems like Microsoft™ DOS essentially treat the computer as a giant filing cabinet containing documents and applications. A strictly hierarchical file directory provides a rigid, tree-like structure for this digital file cabinet. Individual documents are the "leaves" of this tree hierarchy. The directory structure generally does not include or express relationships between leaves, and users generally access documents and applications individually, using the directory structure. Even the now ubiquitous graphical "desktop" computing environment, popularized for personal computers by the Apple Macintosh™ and Microsoft Windows™ operating systems simulates a traditional office environment. Individual documents and applications, represented by graphical icons, are displayed on the user's screen, to be accessed one-at-a-time. Once again, a strictly hierarchical, tree-like directory structure is imposed to organize the contents of the desktop.

Although the desktop and file cabinet metaphors have been commercially successful, the limitations and drawbacks of these traditional metaphors become clear when one considers the strikingly different way in which the world's other powerful information processing machine—the human brain—organizes information. Instead of being confined and limited to strictly hierarchical file directory structures, the human brain is thought to interconnect numerous pieces of information through flexible, non-hierarchical, associative networks. As those of skill and experience in the art are aware, it is often clumsy for users of traditional, prior art operating system interfaces to process multiple pieces of information if these pieces are contextually related in some way, but are stored in separate files and/or are associated with different application programs. Too often, the prior art method of organizing information leads users to create documents that may contain one or more phrases or thoughts that will be useful in later documents. The user then stores the documents in the prior art hierarchical categories only to forget the location and content of the key phrases soon after storing the document in memory. Intended to assist users, traditional hierarchical structures and "desktop" metaphors compel users to organize their thought processes around their computer software, instead of the reverse. The inadequacy of "real-world," hierarchical metaphors for information management was recognized prior to the advent of the computer, but until now has not been successfully remedied.

Take the case in which a bankruptcy attorney who repeatedly creates and recreates the same types of documents over and over again. When he wants to re-use one or more portions from one or more previous documents, he must remember the name of the old document and the location of the portion of interest. Under the current paradigm, the bankruptcy attorney retrieves the old documents, cuts relevant portions from the old documents and then pastes them in the new document. As the number of historical documents grows, so too does the likelihood that the attorney will forget his favorite passages, their locations, or both.

The recent deluge of digital information bombarding everyday computer users from the Internet only heightens the need for a unified, simple information management method which works in concert with natural thought processes. Additionally, users' ready enthusiasm for the World Wide Web graphical "hypertext" component of the Internet demonstrates the appeal of associative, nonlinear data structures, in contrast to the limiting structure of computerized desktop metaphors. And yet, prior art web browsers and operating systems awkwardly compel users to navigate the associative, non-dimensional structure of the World Wide Web using linear, or at best hierarchical user interfaces.

What is desired is an effective methodology for organizing, processing and displaying pieces of interrelated information using a digital computer. The methodology should support flexible, associative networks of digital thoughts, and not be limited to strict, tree hierarchies as are conventional, prior art technologies. A related goal is to create an intuitive and accessible scheme for graphically representing similar ideas, providing users with access to diverse types of information in a manner that maximizes retrieval speed of the information and minimizes user interaction necessary for retrieval. The methodology should additionally be optimized to enable users to seamlessly manage, navigate, and share the information both locally on digital information devices, as well as remotely via digital telecommunications networks such as local area networks, wide area networks, and public networks such as the Internet.

SUMMARY

Systems and methods consistent with the present invention satisfy the above-described need by providing a computerized system and method for personalizing a document. In one embodiment, a user at a computer retrieves a first message comprising at least one change point from memory. A change point is a point in the message at which a change may occur: a word or phrase may be substituted for other words/phrases by a user to alter a message or enhance its meaning. Once the message is retrieved, the user either selects an alternate phrase for the change point, or creates a new addition to the array of possibilities for that change point, to personalize the message. The present invention also includes a method for populating a database with personalized words and phrases. In operation, the system monitors a user's deletion and subsequent addition of text into a document. The system compares the deleted text with a change point stored in a database, and then associates the added text (if any) with a change point in the database if there is a change point entry in the database corresponding to the deleted text.

Additional benefits of the invention will be set forth in part in the description which follows, and in part will be obvious from the description, or may be learned by practice of the invention. The benefits of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary embodiments of the present invention and together with the description, serve to explain the principles of the invention. In the drawings.

DETAILED DESCRIPTION

Figure 1:
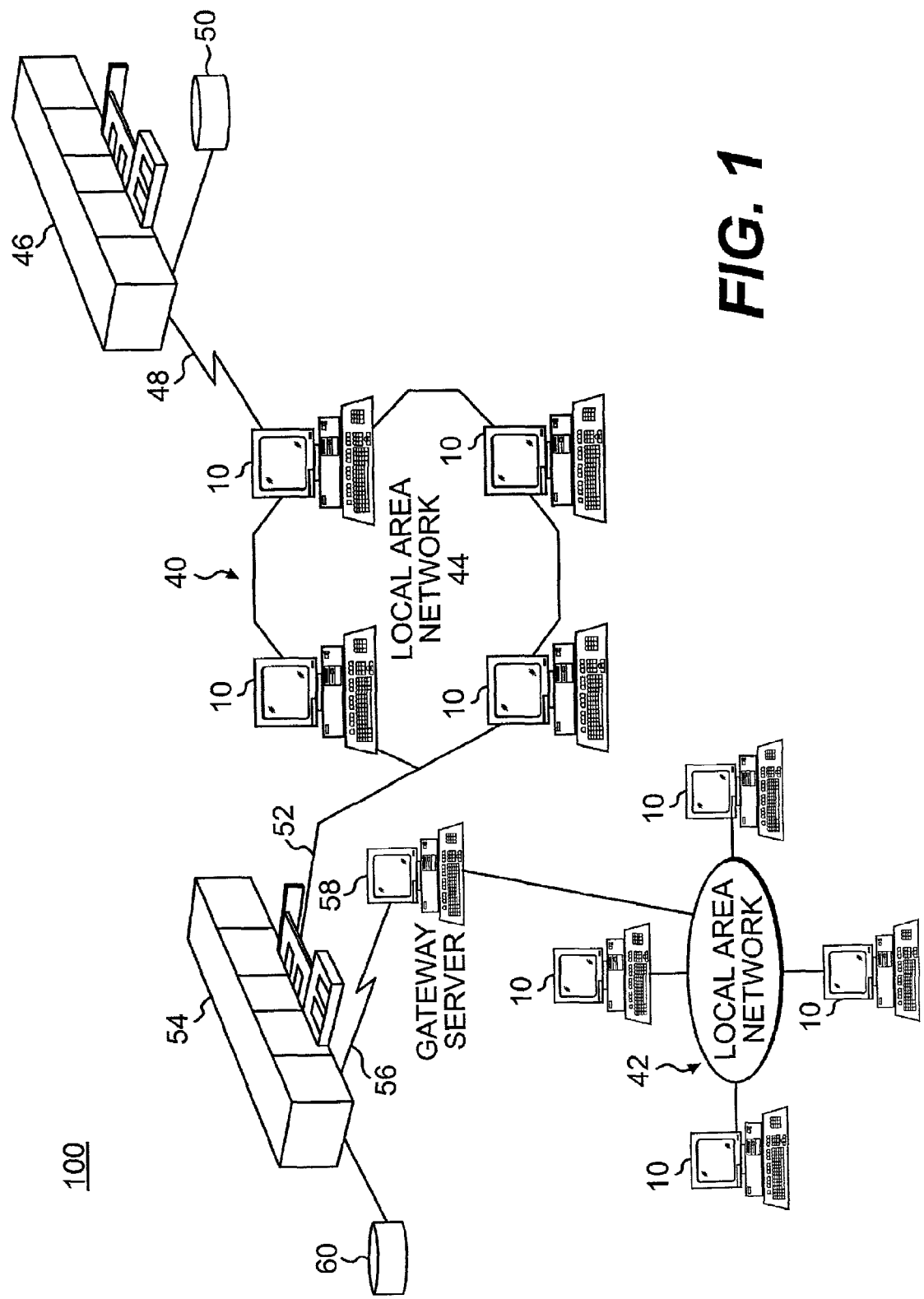
FIG. 1 is a block diagram depicting an illustrative system in which the present invention may be practiced.

In the following detailed description of the preferred embodiment, reference is made to the accompanying drawings that form a part thereof, and in which is shown by way of illustration a specific embodiment in which the invention may be practiced. This embodiment is described in sufficient detail to enable those skilled in the art to practice the invention and it is to be understood that other embodiments may be utilized and that structural changes may be made without departing from the scope of the present invention. The following detailed description is, therefore, not to be taken in a limited sense.

Turning first to the nomenclature of the specification, the detailed description which follows is represented largely in terms of processes and symbolic representations of operations performed by conventional computer components, including a central processing unit (CPU), memory storage devices for the CPU, and connected pixel-oriented display devices. These operations include the manipulation of data bits by the CPU and the maintenance of these bits within data structures residing in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require logical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, objects, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc. which are often associated with manual operations performed by a human operator. It must be understood that no such involvement of a human operator is necessary or even desirable in the present invention. The operations described herein are machine operations performed in conjunction with a human operator or user who interacts with the computer. The machines used for performing the operation of the present invention include general purpose digital computers or other similar computing devices.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

The operating environment in which the present invention is used encompasses general distributed computing systems wherein general purpose computers, workstations, or personal computers are connected via communication links of various types. In a client server arrangement, programs and data, many in the form of objects, are made available by various members of the system.

Referring now to the drawings, in which like numerals represent like elements throughout the several figures, the present invention will be described.

FIG. 1 illustrates a data processing network 100 in which the present invention may be practiced. The data processing network 100 includes a plurality of individual networks, including LANs 42 and 44, each of which includes a plurality of individual workstations 10. Alternatively, as those skilled in the art will appreciate, a LAN may comprise a plurality of intelligent workstations coupled to a host processor. LAN 44 may be directly coupled to another LAN (not shown), a mainframe 54 or a gateway server 58.

Gateway server 58 is preferably an individual computer or intelligent workstation that serves to indirectly link LAN 42 to LAN 44. Data processing network 100 may also include multiple servers, such as a servers 46 and 54. Mainframe computers 46 and 54 may be preferably coupled to the LAN 44 and LAN 42 by communications links 48, 52 and 56. Mainframe computers 46 and 54 may also be coupled to storage devices 50 and 60, respectively, which may serve as remote storage for LANs 44 and 42, respectively. In one embodiment, storage device 50 may store records associated various on-line greeting card formats and storage device 60 may store records associated with popular text phrases that may be integrated into on-line greeting cards.

Those skilled in the art will appreciate that the server 46 may be located a great geographic distance from the LAN 44. Similarly, the LAN 44 may be located a substantial distance from the LAN 42.

A system in accordance with the present invention, comprises a plurality of workstations 10 and associated servers and mainframes. The servers may be generally similar to the workstations 10 including a central processing unit, display device, memory and operator input device. Moreover, it will be appreciated that workstation 10 may also perform operations described herein as being performed by a server, and similarly a server may also perform operations described herein as being performed by workstation 10. The distributed system may comprise any one of a number of types of networks over which workstations and servers communicate, including LANs, wide area networks (WANs), the Internet and any other networks that distribute processing and share data among a plurality of nodes. All of these configurations, as well as the appropriate communications hardware and software, are known in the art.

Figure 2:
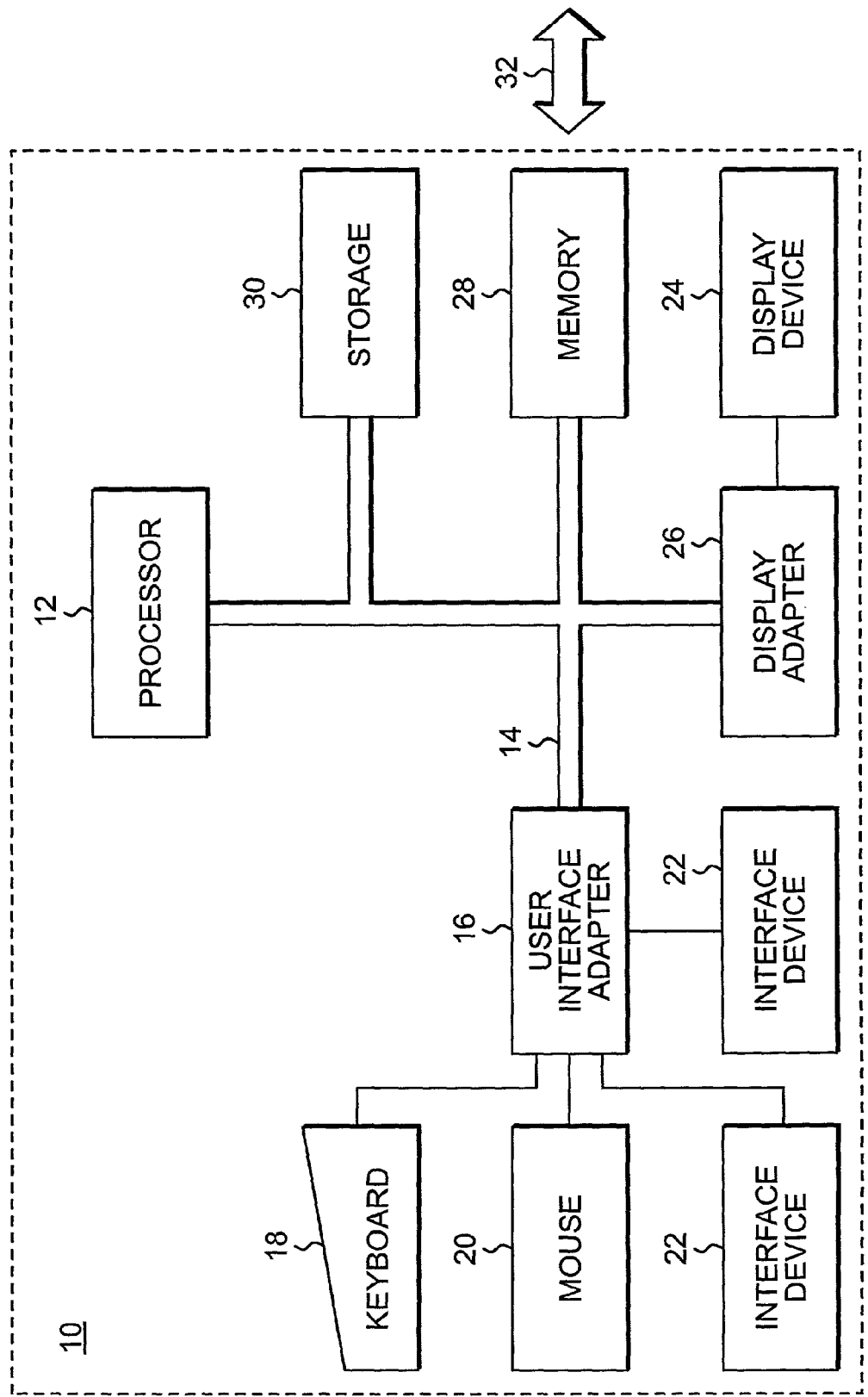
FIG. 2 is block diagram depicting components of a user/client computer consistent with one embodiment of the present invention.

FIG. 2 illustrates a detailed representation of a single user computer workstation 10 as shown in FIG. 1. Workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via bus 14 to one or more interface devices, such as a keyboard 18, mouse 20, and/or other interface devices 22, which can be any user interface device, such as a touch sensitive screen, digitized entry pad, etc. Bus 14 also connects a display device 24, such as an LCD screen or monitor, to the microprocessor 12 via a display adapter 26. The bus 14 additionally connects the microprocessor 12 to memory 28 and long-term storage 30 which can include a hard drive, diskette drive, tape drive, etc.

Figure 3:
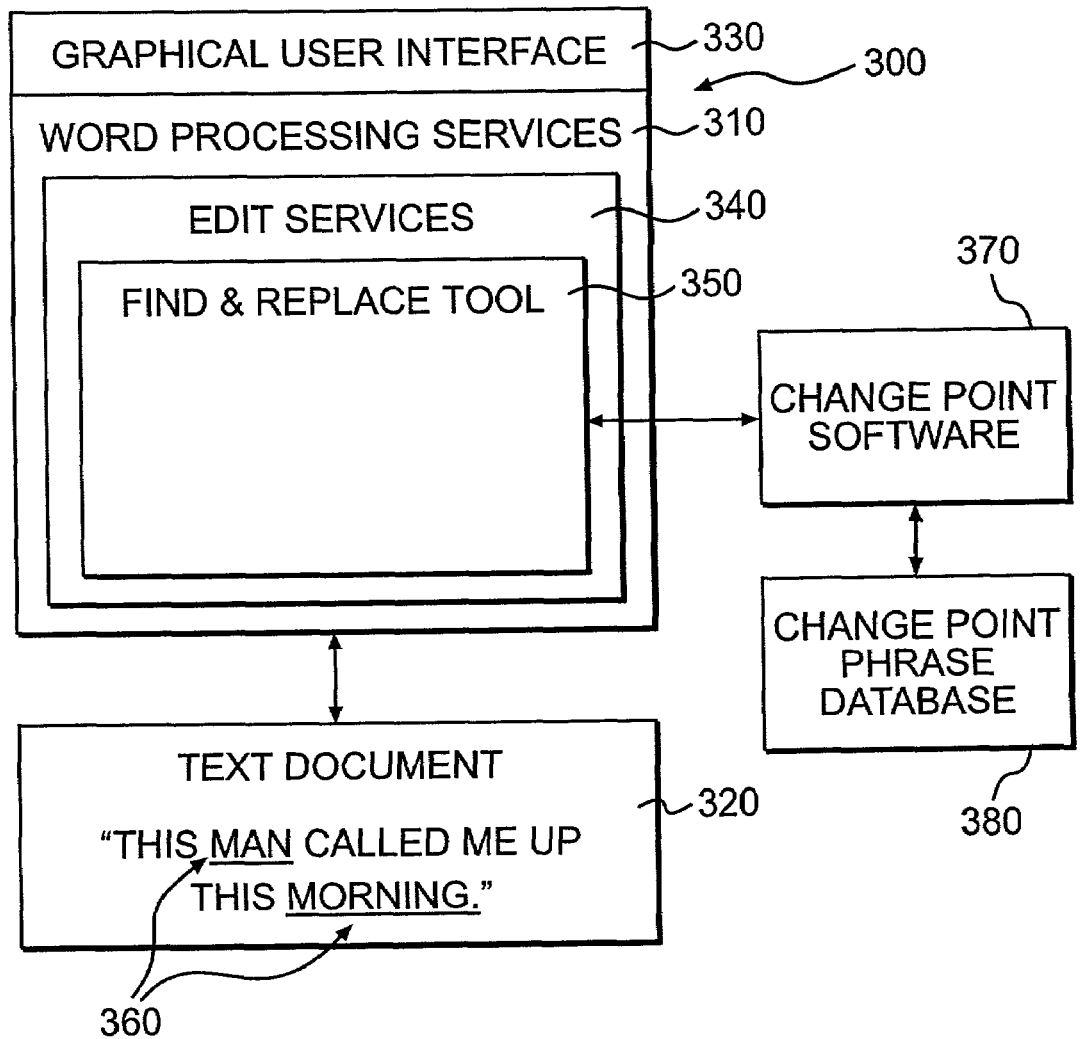
FIG. 3 is a block diagram depicting the operation and interfaces of an application program operating on a server consistent with one embodiment of the present invention.

Referring now to FIG. 3, there is shown one embodiment of the present invention in the context of a word processor 300, such as Microsoft™ Corporation's Word™. As shown, word processor 300 comprises various word processing services 310 that a user may access to create and modify a text document 320. Word processing services 310 are accessible to the user through a graphical user interface (GUI) 330 which provides controls such as a conventionally known tool bar or menu structure by which the services 310 are activated. Word processing services 310 also are available through a macro language, or other automation facilities which permit word processing services 310 to be controlled by a separate application program or from a macro with or without user interaction. Word processing services 310 include services that implement many conventionally known word processing functions, including filing, printing, formatting, spell-checking, etc. Word processing services 310 also include edit services 340, some of which are conventionally known functions such as cut, paste, and copy functions. In addition, the edit services 340 include a find and replace editing tool 350.

Text document 320 may comprise a plurality of textual and non-textual components, also called change points 360. Change points 360, as shown in FIG. 3, are depicted as underlined words in a sentence, but they may be identified via any of a number of techniques (e.g., color, bold, italics, etc.) without departing from the spirit and scope of this invention. In one embodiment, change points 360 are ideas or themes that may be substituted for existing themes in a text document to alter the message created in the document. In one embodiment, change points may be words, phrases or scenes (or story elements) which may be substituted for other words/phrases/scenes by a user to alter the message conveyed by the sentence or story to enhance its meaning. In a second embodiment, change points may be embedded into other change points. For example, a word in a change point phrase may itself be a change point. In the case of text, this means that a given phrase in a text document may be exchanged for other phrases. Change points 360 for a word or phrase may, for example, be synonymous with, a humorous version of, a personalized version of, or a more formal version of an existing word or phrase. In one embodiment, candidate replacement phrases appear in a pop-up window adjacent to the change point 360 when a user passes a cursor or other symbol over or near the change point text.

Word processor 300, as further shown in FIG. 3, also interfaces with a change point software 370 to identify phrases that may be substituted at various change points 360 in text document 320. When a user enters text into text document 320, change point software 370 implements functions to compare text entered into text document 320 with words and phrases stored in a change point phrase database 380. When a match is found, change point software 370 alters the appearance of the newly-inputted text to indicate that the text is a change point.

When a user operating the present invention retrieves a text document 320 from memory 28, change point software 370 implements functions to retrieve a list of words and phrases associated with a change point 360 and to display the list of words when the user passes the cursor over the change point text. In response to a user request, change point software 370 is also adapted to substitute words and phrases stored in change point phrase database 380 for words and phrases found in text document 320.

Change point phrase database 380 contains a plurality of change points 360 with associated words and phrases related to the change points. Entries in change point phrase database 380 may also include a plurality of weights with associated themes. For example, a phrase in change point database (e.g., "a bouquet of flowers") may have one weight associated with a first theme (e.g., romance) and a second weight associated a second theme (e.g., mystery). The weights may affect where (or even if) a change point appears in a list presented to a user. In one embodiment, change point phrase database 380 may be populated with a plurality of change points and associated words/phrases from dictionaries, thesauruses, and other publications. Change point phrase database 380 may also be populated by "experts" (e.g., doctors, lawyers, engineers, photographers, fishermen, etc.) that supply the change points and associations that may later be used by laypersons. As explained below, change point phrase database 380 may also be supplemented with words and phrases derived from user edits of text documents. In effect, change point phrase database 380 is an organized collection of the thoughts and expressions conveyed in a plurality of documents. Users wishing to retrieve similar or related thoughts and expressions no longer are forced to recall a document's name that contains the thoughts, and need only recall a related thought or idea.

The present invention may be implemented as a computer software program. This program will be used where software application(s) running on a Web server respond to a user's manipulation of mouse 20 or other user interface device, perform processing that results in alternate content being identified and substituted in an existing document. According to the present invention, the user's behavior when accessing the application(s) is monitored and recorded. The implementation of the logic for performing the monitoring and recording function may be integrated with the code of the server application, as one or more modules (also referred to as code subroutines, or "objects" in object-oriented programming) which are invoked during execution of the server application. Alternatively, the logic may be implemented as a separate utility program, which provides services that are accessed by the server application. The implementation will typically execute on a computer functioning as a Web server, where that Web server provides services in response to requests from a client using a Web browser connected to the Internet. Alternatively, the connection may be to a corporate intranet or extranet (that is, a network owned or managed by the user's company or another company, respectively) of which the user's computer is a component, where this corporate intranet or extranet provides services in a similar manner to the Internet. Use of the term "Internet" herein, when discussing processing associated with the user's request, includes processing that occurs in an intranet or extranet, unless otherwise stated. Client requests will typically be sent to the host server using the HTTP protocol. However, because the present invention operates independently of the mechanism used to fetch the data, other protocols such as FTP (File Transfer Protocol), Gopher, etc., may also be used without deviating from the inventive concepts defined herein.

In one embodiment, software programming code which embodies the present invention is accessed by microprocessor 12 (FIG. 2) of workstation 10 from long-term storage media 30, 50 or 60, such as a CD-ROM drive or hard drive. In a client-server environment, such software programming code may be located in a storage location associated with a server. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. The programming code may alternatively be embodied in memory 28, and accessed by microprocessor 12 using bus 14. The techniques and methods for embodying software programming code in memory, on physical media, and/or distributing software code via networks are well known and will not be further discussed herein.

Figure 4:
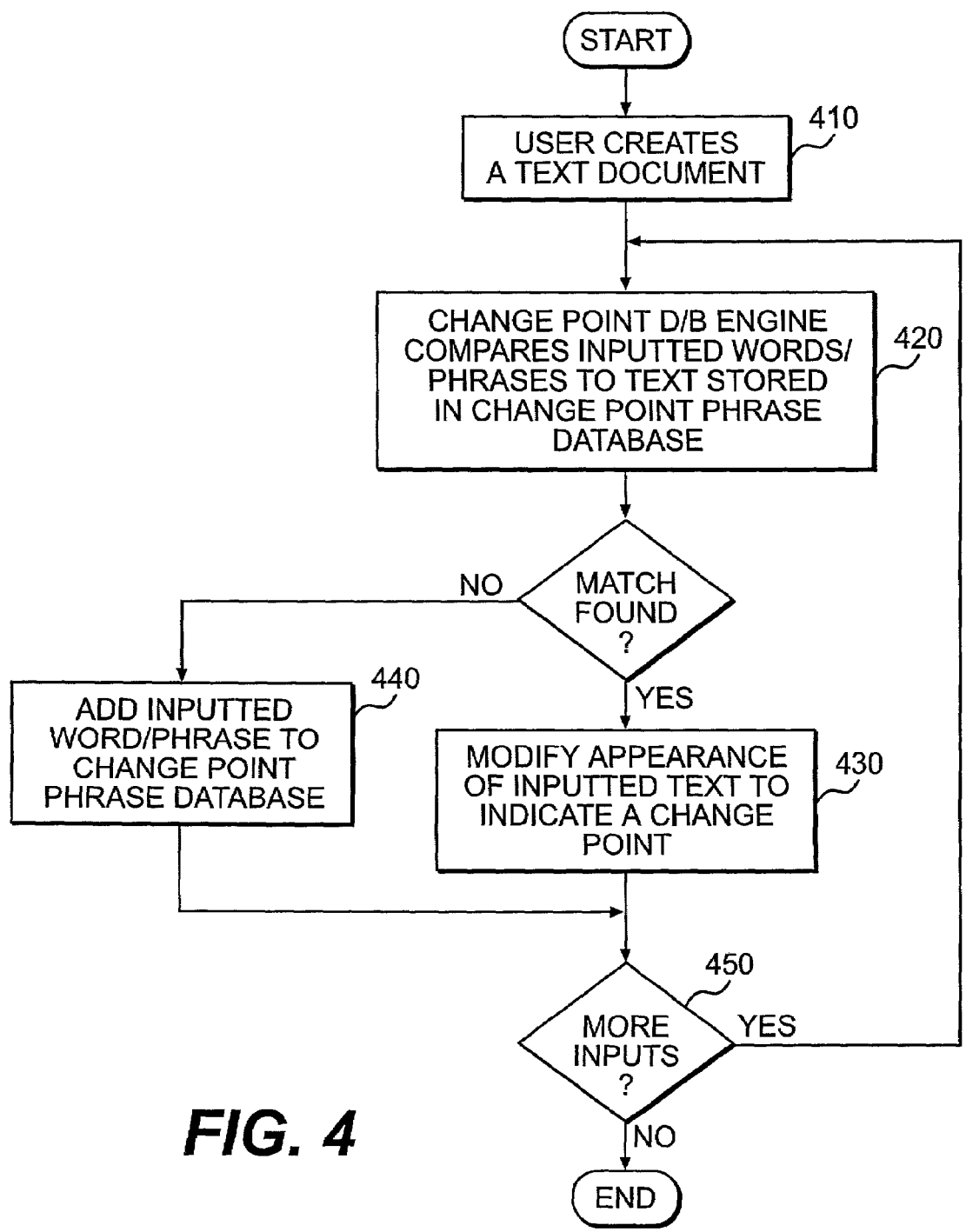
FIG. 4 is a flow diagram of a method for adding change points to a text document consistent with one embodiment of the present invention.

Referring to FIG. 4, there is shown a flowchart performed by the present invention in response to a user inputting text into a document. As shown in step 410, the process begins when a user at a client computer 10 creates a document using word processing services 310. As the user enters text via word processor 310, change point software 370 compares each inputted word and phrase to words and phrases stored in change point phrase database 380 (step 420). When a match is found, change point software 370 alters the appearance of the text to indicate that it is a change point (step 430). If a match is not found, change point software 370 adds the word or phrase to change point phrase database 380 (step 440). If there are more inputs (step 450), processing flows to step 420.

Figure 5:
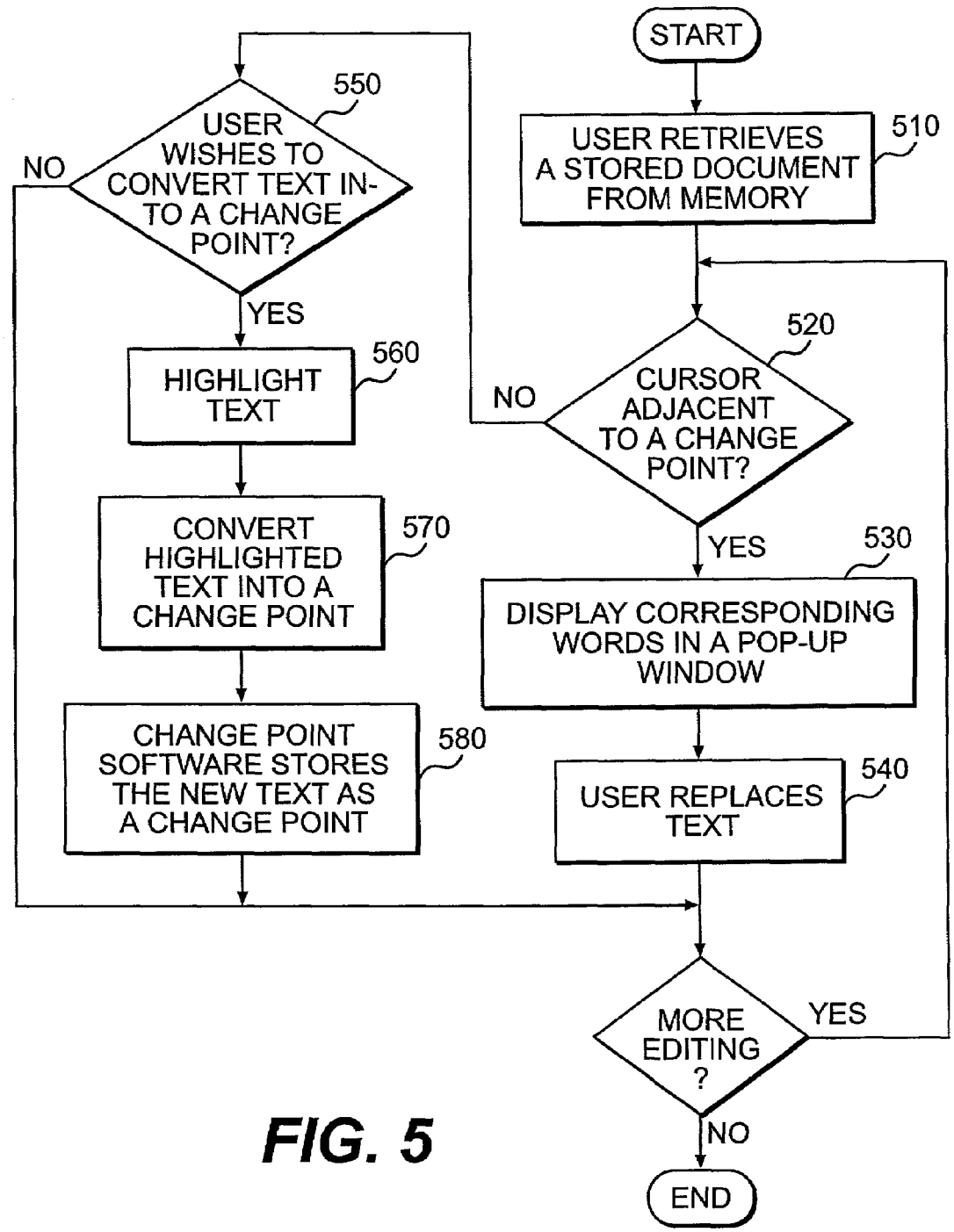
FIG. 5 is a flow diagram of a method for editing a document that contains change points.

Referring now to FIG. 5, there is shown a flowchart depicting the steps performed by the present invention in response to a user modifying text in a previously saved document. As shown, processing begins when a user retrieves a stored document from memory (step 510). Change point database engine 370 monitors the user's placement of the cursor to determine when the cursor is positioned adjacent to a change point 360 (step 520). If the cursor is near a change point 360, change point software 370 retrieves the words and phrases that correspond to the change point from change point phrase database 380 and then displays the words and phrases in a pop-up window next to the cursor (step 530). In a second embodiment, the present invention may instead display the words and phrases corresponding to a change point 360 in response to a user's activation of one or more buttons on mouse 20. Once the associated words and phrases have been identified, the user may then replace the change point 360 with one of the words and phrases displayed in the pop-up window (step 540). If the cursor is adjacent to a word that is not a change point, change point software 370 monitors the user's action to determine whether the user would like to convert the word to a change point (step 550). In an exemplary embodiment, the user may indicate this interest by pressing one or more buttons on mouse 20. If the user indicates an interest in converting the word into a change point, processing flows to step 560 and the text is highlighted. Change point software 370 then converts the highlighted text into a change point (step 570) and then in step 580, stores the new change point in change point database 380. If the user has more editing to perform, processing flows to step 520, otherwise processing terminates.

Figures 6A, 6B, 6C:
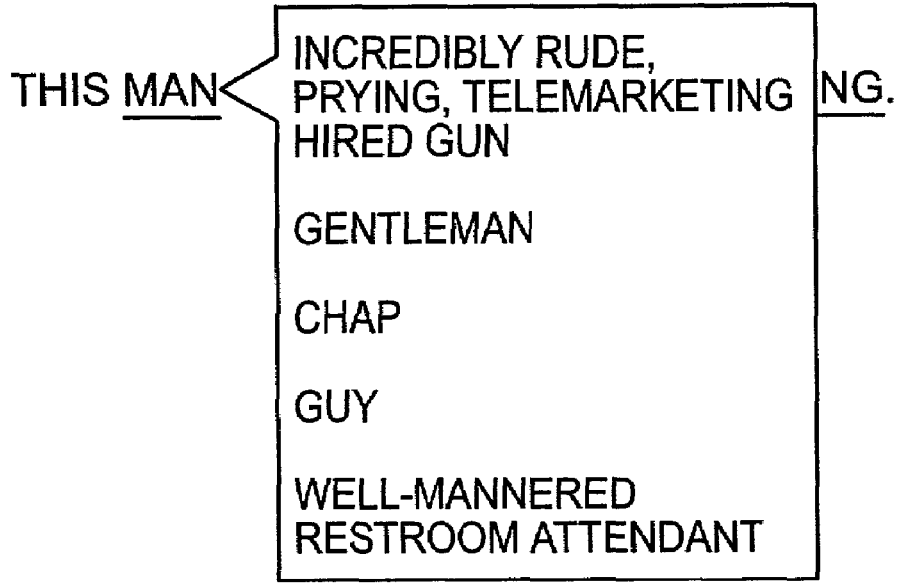
FIG. 6 is a diagram depicting the operation of the present invention consistent with one embodiment of the present invention.

Referring to FIG. 6, there is shown an example of the operation of the present invention as described in FIGS. 4 and 5. As shown in FIG. 6a, a user starts with the phrase "This man called me up this morning." The words "man" and "morning" are indicated as change points. Referring to FIG. 6b, it is shown that when the user places the cursor over or near the word "man", he sees a series of alternative words and phrases. The list of words and phrases may be ordered according to the weights associated with each change point. For example, if the theme or genre of the message (as selected by the user) is business-related, then "incredibly rude, prying, telemarketing hired gun" may appear very high on the list of possible change points. On the other hand, if the theme of the message is romantic, then "incredibly rude, prying, telemarketing hired gun" may appear much lower on the list because it is less likely to be relevant and therefore selected. In some cases, the phrase may not appear on the list at all. If the theme of the message is humorous, then "incredibly rude, prying, telemarketing hired gun" may appear somewhere between its location for business-related messages and romantic messages. The point here is that change points are ideas that become more or less appropriate based on the theme of the underlying message. Stated another way, it is the surrounding elements that create context and give meaning to an isolated phrase. In this example, the user selects "incredibly rude, prying, telemarketing hired gun". In FIG. 6c, it is shown that the phrase now reads "This incredibly rude, prying, telemarketing hired gun called me up this morning." The user could also (or alternatively) select an alternate phrase for "morning" to further alter the message. One embodiment of the present invention may maintain a counter associated with each word and phrase stored in change point phrase database 380 and then increment the counter whenever a user selects a particular word or phrase. In this way, system administrators and users can identify the popular and unpopular words/phrases. Change point software may also provide users with a list of the popular change point phrases so that the user may make a selection based on popularity in combination with their personal preferences.

Instead of entering change points 360 from a menu, a user may input change points via keyboard 18. Using an advanced variation on the auto-expand technology, the present invention will allow users to start typing words and phrases and automatically suggest the rest of the word. For example, suppose a person would like to send a message to his girlfriend. The message begins: "You make me feel so [change point]." When the cursor is located adjacent to the change point, the user decides to type the word "fine". He types "f" and the present invention suggests "fantastic". He then types an "i" and the program suggests "filled with the white flame of your eternal love." While this is not the phrase the user had in mind, he likes it more than his choice, so he uses it. This same auto-expand feature may be used to implement a personalized database for each user. For example, when a first user types "Ro" then the program might suggest the word "Rosemary," the first user's wife's name. A second user may similarly type "Ro" and have the word "Robert" suggested (the second user's husband's name). In addition to these auto-expand applications, the user may be able to designate subject areas which will also have sub-databases of suggestions. For example, if a user is working on contracts and he types "con," the program might suggest "contract." On the other hand, if the user is working on an email to a friend, the program might suggest "concert" when faced with the same two letters.

In a second embodiment, the present invention may be used to quickly create and personalize text messages. For example, a user wishing to create a message in an online greeting card no longer needs to create the message from scratch. With the present invention, the user may answer one or two simple questions (more if they desire) that would then be used to create a personalized message. The personalized message will consist of a plurality of change points that were automatically selected by change point software 370 such that the user's personalization is maintained and a coherent theme conveyed. The present invention maintains coherency through a process of restriction. In other words, early user selections constrain or restrict subsequent selections. The relationships between restrictions may be inputted by writers/editors or users, or they may be automatically determined.

Figure 7:
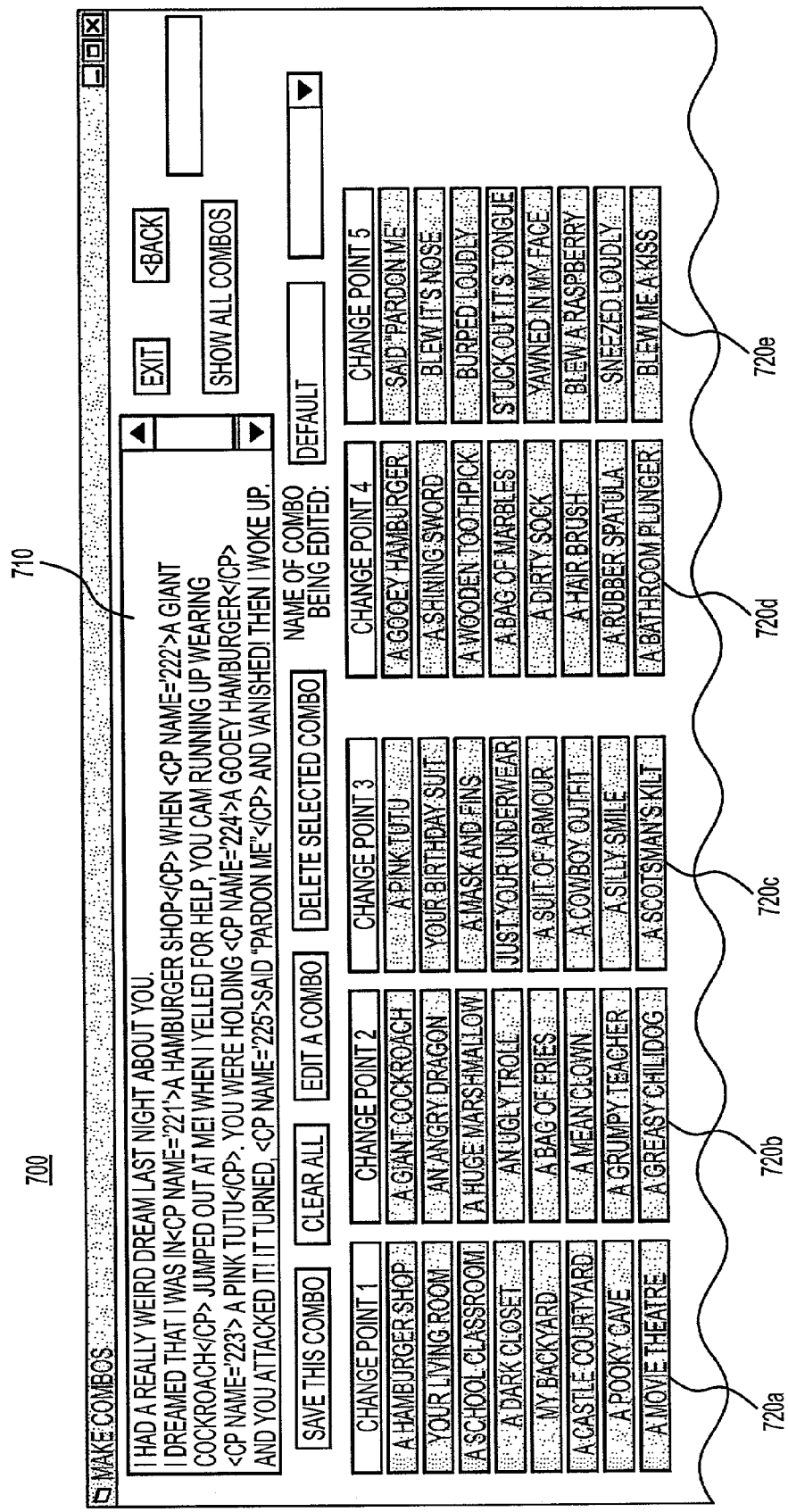
FIG. 7 is a diagram of a database interface for implementing context restrictions consistent with one embodiment of the present invention.

Referring now to FIG. 7, there is shown a sample interface 700 for implementing restrictions in accordance with one embodiment of the present invention. As shown, interface 700 is comprised of a short message 710 and a plurality of stacks 720a-e, each comprised of a plurality of entries. Each stack 720 corresponds to a change point in message 710. Entries may initially be placed in each stack by experts and then augmented by the users as they create new personalized messages. As shown in FIG. 7, some of the entries in stacks 720 are shaded and others are not. The shaded entries are context-specific such that if a shaded entry is selected by a user, then only other shaded entries from other stacks will appear and therefore be selectable by the user. All entries remain valid in those stacks in which no entries are shaded. Also, more than one shaded entry may exist in each stack. Once the message is created, the user may then personalize the message by substituting change points 360 wherever desired.

Figure 8:
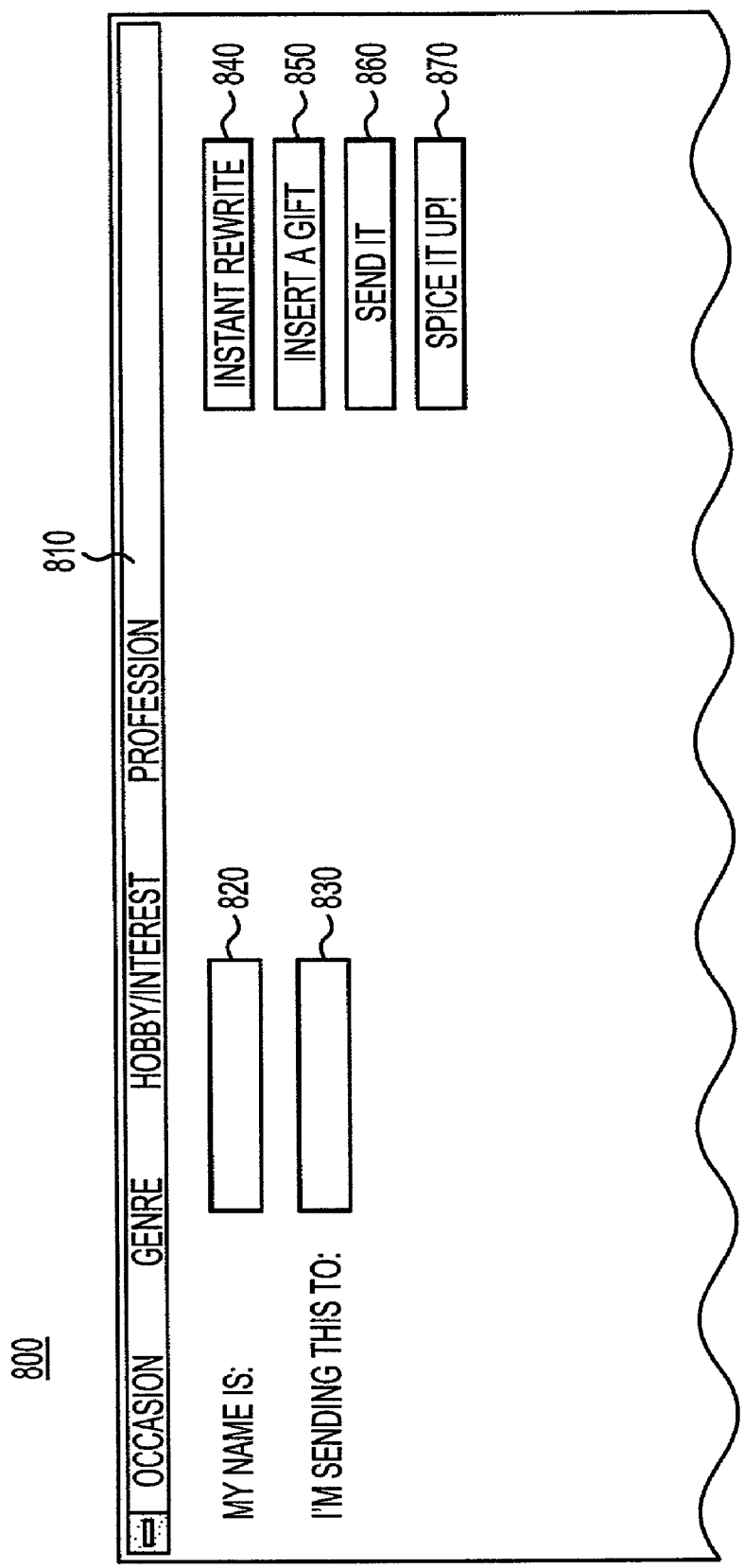
FIG. 8 is a diagram of a dialog box for creating personalized messages consistent with one embodiment of the present invention.

Referring to FIG. 8, there is shown a dialog box 800 that may be presented to a user to enable the user to create personalized messages in accordance with one embodiment of the present invention. Dialog box 800 may contain selections 810: Occasion, Genre, Hobby/Interest and Profession; a plurality of input fields 820-830, and a plurality of buttons 840-870. In one embodiment, dialog box 800 contains input fields for Name 820 and Recipient 830, and buttons for Rewrite 840, Gift Insert 850, Send 860 and Spice it Up! 870. After a user selects one of the following selections 810 using mouse 20, the following sub-menus may appear: Occasion (Birthday, Anniversary, Graduation, Christmas, Easter, Consolation, Congratulations, etc.), Genre (Western, romantic comedy, Drama, Detective, Romance, Sci-Fi, Adventure, War, Children, Family, Historical, etc.), Hobby/Interest (Antiques, Art, Ceramics, Cooking, Exercise, Fashion, Fishing, Gardening, Music, Photography, Needlework, Pottery, Reading, Sewing, Sports, etc.), and Profession (Computer Programmer, Publisher, Attorney, Building Inspector, Roofer, Electrician, Painter, Doctor, Actor, Dancer, Musician, etc.). After the user has selected one or more sub-menus, he then requests the creation of a new personalized message. In response, the present system determines a message with change points to present to the user that incorporates the concepts represented by the one or more submenus. Name 820 and recipient 830 input fields are adapted to receive text characters indicative of a user name and an intended recipient's name. Rewrite button 840 allows the user to request a new message with or without also making new selections 710.

The short message displayed may be a message generated by a retailer that creates a story around an item the retailer sells. The story may alternatively be a humorous or fanciful story that revolves around the user's selections. A user then enters his/her name in Name 820 button and the name of the person to whom the message is addressed in Destination 830. In one embodiment, when the user begins typing his/her name each letter is immediately displayed in the text of the message so that the user can immediately see the dynamic relationship between his entries and evolving story. From the inputted names, the present system will also automatically recognize the sex of the sender/recipient and adjust all personal and possessive pronouns accordingly. Also, if the early part of the message refers to a golf game, for example, then the writer/editor is given the opportunity to restrict later portions of the message to golf, as well. In other words, if the user selects "You're a birdie," or other golf-related phrase early in the message, then certain later choices (such as those having to do with baseball, fly-fishing, or ballet) may be eliminated from consideration. This ensures that the message will make sense and be coherent.

The present invention also has the capability of inserting a hyperlink to a gift into the message. For example, if the user would like to send a gift to the recipient of an online greeting card, he/she may do so by pressing the gift insert button 850. The user may then be routed to a retailer's online site to select and view a gift item. A link to the gift will then be placed in the message. When the recipient receives the online greeting card, he/she can click on the hyperlink and then be routed to the retailer's site to view the gift that was purchased (possibly with the price removed). In this way, the present invention routes at least two users to a retailer's site.

The retailer sites selected may be random, user-selected, or dependent on pre-existing financial relationships with online retailers. Gift items may also be categorized in a database. For example, if the story provides that "I opened up the plastic Easter egg and found this ring inside," a user may be able to select a gift change point and be presented with "these earrings," or "this brooch" as similarly sized/priced gift alternatives. A scarf would not be a suitable alternative nor would a necklace or ankle bracelet. Valid gift items might be grouped by physical size, characteristics, price etc. If the story calls for the gift item to be tossed into a room, the present invention may only select gift items that were not breakable. A user selecting a gift for a recipient may do so based on knowledge the user has of the recipient's preferences for certain gifts, or their wants and needs. The user, in essence, may be analogized to an advertiser with specialized knowledge of a recipient's gift preferences. If the gift is simply shown to the recipient by the user (i.e., not sold to the user), it may be offered to the recipient by an online merchant who stocks the item.

The user may alter the change points 360 in the message, or he/she may request a new message altogether by pressing rewrite button 840. Prior to transmitting the message to the intended recipient, the user may wish to "spice up" the message by changing the tone of the message. For example, the user may wish to change the message from "I like you" to "I love you". Similarly the user may wish to change the message from "I like you" to "I hate you". Either of these operations could be performed with the Spice it Up! button 870. In a second embodiment, Spice it Up! button 870 may be a sliding bar which may be slid to the right and to the left to increase and decrease the tone of a message. Once the user is satisfied with the message, he/she can transmit it to the intended recipient by pressing the Send button 860. With this embodiment of the present invention, a user no longer needs to choose a gift and then choose a card to go with the gift. Now the user has the opportunity to create a story that he believes the recipient will enjoy and integrate a gift into the story.

Figure 9:
FIG. 9 is a diagram of FIG. 8 including a partially completed message.

Referring now to FIG. 9, there is shown a sample message that has been created. As shown, the user's name is "David" and the message is addressed to "Henry". The addressee's name as shown, is only partially completed. This partial completion is reflected in the text of the message, allowing the user to immediately see the dynamic relationship between his entries and the evolving story. FIG. 9 also shows the process whereby a user may pass the cursor over a change point 360 and then be presented with a pop-up window that contains alternate choices to replace the existing text.

In one embodiment, the user may also be given the opportunity to select a decorative cover for the online greeting card. For example, the user may be presented with a plurality of decorative covers. The covers may depict art scenes, historical scenes, comedic depictions, digitized photos provided by the user, etc. The present invention may compensate the artist or owner of the art work whenever a user selects a scene created by the artist. Once the user is satisfied with the message and the card, he/she simply presses the Send button 860 and the message is transmitted to the intended recipient. Instead of transmitting an online card to an online user, the user may print the card out and send it to the recipient using conventional mail or other methods of physical delivery.

In another exemplary embodiment, change point software 370 may monitor user actions and edits to identify trends and possibly modify the program's operation. For example, when change point software 370 creates a personalized message, it does so by retrieving a collection of randomly selected allowable combinations of words or phrases. One embodiment may monitor user changes made to the automatically created document (including changes to the tone of the letter) to identify the number of times that the randomly generated document is changed. If the randomly-generated document is frequently changed, change point software 370 may modify the method for selecting change points such that documents generated in the future may require less user changes. Another embodiment may monitor and record the user ID of the user person making changes and the changes made such that a profile of the user may be created and future documents may be created that require less changes. The user ID and user profile may be used to create targeted mailings. In other words, if a user changes the tone of an automatically created personalized message from neutral to humorous (or very angry), change point software 370 may generate an angry (or humorous) alternative to the message and send it to the user as a further example of the system capabilities.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

From the foregoing description, it will be appreciated that the present invention provides an efficient system and method for providing real-time merchandising information. The present invention has been described in relation to particular embodiments which are intended in all respects to be illustrative rather than restrictive. Those skilled in the art will appreciate that many different combinations of hardware will be suitable for practicing the present invention. Many commercially available substitutes, each having somewhat different cost and performance characteristics, exist for each of the components described above.

Although aspects of the present invention are described as being stored in memory, one skilled in the art will appreciate that these aspects can also be stored on or read from other types of computer-readable media, such as secondary storage devices, like hard disks, floppy disks, or CD-ROMs; a carrier wave from the Internet; or other forms of RAM or ROM. Similarly, the method of the present invention may conveniently be implemented in program modules that are based upon the flow charts in FIGS. 5-6. No particular programming language has been indicated for carrying out the various procedures described above because it is considered that the operations, steps and procedures described above and illustrated in the accompanying drawings are sufficiently disclosed to permit one of ordinary skill in the art to practice the instant invention. Moreover, there are many computers and operating systems which may be used in practicing the instant invention and therefore no detailed computer program could be provided which would be applicable to these many different systems. Each user of a particular computer will be aware of the language and tools which are most useful for that user's needs and purposes.

Alternative embodiments will become apparent to those skilled in the art to which the present invention pertains without departing from its spirit and scope. Accordingly, the scope of the present invention is defined by the appended claims rather than the foregoing description.

What is claimed is:

1. A computerized method for personalizing a document comprising:
retrieving a document from memory, said document comprising a plurality of related change points, wherein each change point may be substituted for alternate words or phrases to personalize the document;
determining a position for a cursor;
assigning a weight to the alternate words or phrases for at least one of the related change points, the weight identifying a relationship between a theme of the document and the alternate words or phrases;
ordering the alternate words or phrases using the weight;
displaying the ordered alternate words or phrases for at least one of the related change points, provided the cursor is adjacent to the change points; and
displaying, adjacent to the at least one alternate word or phrase, a counter associated with the at least one alternate word or phrase, the counter indicating a number of times that the associated alternate word or phrase has been substituted for a change point.

2. The method of claim 1, further comprising the step of substituting an alternate word or phrase selected from the ordered words or phrases for the change point.

3. The method of claim 2, further comprising the step of incrementing the counter for the substituted alternate word or phrase.

4. The method of claim 1, wherein displaying further comprises displaying said alternate words or phrases in a pop-up window.

5. A computerized method for personalizing a document comprising:
retrieving a document from memory, said document comprising a plurality of related change points, wherein each change point may be substituted for alternate words or phrases to personalize the document;
determining a position for a cursor;
receiving input from a user at a keyboard;
assigning a weight to the alternate words or phrases for at least one of the related change points, the weight identifying a relationship between a theme of the document and the alternate words or phrases;
ordering the alternate words or phrases using the weight;
displaying the ordered alternate words or phrases for at least one of the related change points that are consistent with the user input and the theme; and
displaying, adjacent to the at least one alternate word or phrase, a counter associated with the at least one alternate word or phrase, the counter indicating a number of times that the associated alternate word or phrase has been substituted for a change point.

6. The method of claim 5, wherein the receiving and displaying steps are repeated until the user inputs a carriage return.

7. The method of claim 5, wherein the input is a letter.

8. The method of claim 5, wherein the input is a word.

9. The method of claim 5, wherein the input is a phrase.

10. The method of claim 5, wherein the change point database is associated with the user.

11. The method of claim 5, wherein the change point database is located on a computer network.

12. A computer readable medium comprising program code instructions which, when executed in a processor, perform a method for preparing a document using personalized words or phrases, the method comprising:
monitoring a user's addition of text into the document;
comparing at least one portion of said addition to at least one entry in a database, wherein said at least one entry corresponds to a plurality of words or phrases that may be substituted for said portion to personalize the document;
associating said portion with an entry in said database, if said portion is related to said entry;
highlighting the portion when the portion is related to the entry;
assigning at least one weight to the entry, wherein the weight indicates a strength of association between the entry and at least one of a plurality of genres; and
adjusting a plurality of portions in the document based upon the association and based on the weight.

13. The computer readable medium of claim 12, wherein the associating step further comprises the step of adding a new entry to the database that corresponds to said portion if there is no entry in the database that corresponds to the portion.

14. A computer readable medium comprising program code instructions which, when executed in a processor, perform a method for placing change points into a document, the method comprising:
retrieving a document from memory, the document comprising a plurality of existing portions of words or phrases;
comparing at least one of the existing portions of said document to entries in a database, wherein said entries may be substituted for a plurality of the existing portions of said document to personalize the document;
converting said plurality of existing portions of said document into at least one change point, if said existing portions are identical to an entry in said database;
highlighting the change points;
adding the plurality of existing portions to the database if the at least one existing portion is not located in the database; and
assigning at least one weight to the entry or to the added portion, wherein the weight indicates a strength of association between the entry and at least one of a plurality of genres.

15. The computer readable medium of claim 14, wherein said existing portion of said document is adjacent to a cursor.

16. A computer readable medium comprising program code instructions which, when executed in a processor, perform a method for creating change points in a document, the method comprising:
receiving input from a user to convert at least a portion of a word or phrase into a first change point, the input including a selection of a portion of the word or phrase by the user;
highlighting the selected portion;
converting the at least one selected portion of the word or phrase into a first change point;
storing the selected portion in a database;
associating at least one additional change point with the first change point to maintain a theme for the document;
associating the selected portion with a pre-existing database entry; and
assigning at least one weight to the selected portion, wherein the weight indicates a strength of association between the selected portion stored in the database and at least one of a plurality of genres.

17. The computer readable medium of claim 16, wherein the method further comprises associating one or more restrictions with the selected portion, wherein said one or more restrictions prevent said selected portion from being placed into a document when at least one pre-existing segment of said document is incompatible with the selected portion.

18. The computer readable medium of claim 16, wherein the receiving and converting steps are repeated until a user-specified time.

19. The computer readable medium of claim 16, wherein the method further comprises converting the appearance of the at least one portion of the document to indicate that it is a change point.

20. A computer readable medium comprising program code instructions which, when executed in a processor, perform a method for natural language composition, the method comprising:
   creating multiple change points in a document;
   highlighting the change points;
   storing text associated with the change points in a database as a database entry;
   assigning at least one weight to the database entry, wherein the weight indicates a strength of association between the database entry and at least one of a plurality of genres;
   creating, for the genres, a restricted choice set of elements for each change point, wherein selection of a first change point with a restricted choice set prevents selection of subsequent change points for placement in the document unless they are within the restricted choice set for the corresponding genre.

21. A computerized method for altering a story comprising:
   storing a plurality of scene elements in a database, the scene elements being assigned at least one weight that indicates a strength of association between the scene elements and a plurality of genres;
   retrieving a scene, said scene comprising a plurality of related change points, wherein each change point may be substituted for at least one alternate scene element to modify the story in a plurality of locations;
   highlighting the change points;
   selecting a highlighted change point;
   displaying, based on the weight, at least one alternate scene element for the selected change point;
   selecting the alternate scene element;
   substituting the selected alternate scene element for the selected scene element to alter the story; and
   providing compensation for use of the alternate scene element.

22. A computer readable medium comprising program code instructions which, when executed in a processor, perform a method for altering a message in a document, the method comprising:
   retrieving the document from memory, the document comprising a plurality of related change points;
   selecting a theme to use in the document;
   assigning a weight for the selected theme to at least one alternate word or phrase;
   substituting the at least one alternate word or phrase for the related change points based on the weight;
   identifying a sex of the creator of the document;
   identifying a sex of the receiver of the document; and
   adjusting portions of the document according to the sex of the creator and the sex of the receiver.

23. A computer readable medium comprising program code instructions which, when executed in a processor, perform a method for altering a message in a document, the method comprising:
   retrieving the document from memory, the document comprising a plurality of related change points;
   providing a plurality of tones for composing the document;
   selecting a tone for composing the document;
   substituting at least one alternate word or phrase for the related change points based on the selected tone;
   identifying a sex of the creator of the document;
   identifying a sex of the receiver of the document; and
   adjusting portions of the document according to the sex of the creator and the sex of the receiver.

* * * * *